United States Patent [19]

MacDonald

[11] Patent Number: 4,967,542
[45] Date of Patent: Nov. 6, 1990

[54] DOG BOOTS

[76] Inventor: Bonita M. MacDonald, 3222 Elliot Ave. South #1, Minneapolis, Minn. 55418

[21] Appl. No.: 482,335

[22] Filed: Feb. 20, 1990

[51] Int. Cl.⁵ .............................................. B68C 5/00
[52] U.S. Cl. ......................................... 54/82; 36/88; 36/111
[58] Field of Search ................ 168/1, 2, 3, 18; 54/79, 54/82; 36/111, 50, 88, 89

[56] References Cited

U.S. PATENT DOCUMENTS

| | | | |
|---|---|---|---|
| 1,660,664 | 2/1928 | Aleksandrowicz | 36/50 |
| 2,064,566 | 12/1936 | Richman | 54/82 X |
| 2,651,853 | 9/1953 | Lewis | 54/82 X |
| 3,209,726 | 10/1965 | Fisher | 54/82 X |
| 4,458,431 | 7/1984 | Sinclair | 36/111 X |

Primary Examiner—Robert P. Swiatek
Attorney, Agent, or Firm—Paul L. Sjoquist; Gerald E. Helget

[57] ABSTRACT

A dog boot for the rear leg of a dog having a foot, a tarsus joint and a fibular tarsal. The dog boot is comprised of a sole extending from the foot to the tarsus joint. An upper heel section is fastened to the sole and fixed proximally the tarsus joint shaped so that the boot is anchored on the leg by the fibular tarsal. The upper heel section has an opening for permitting the foot to enter and be withdrawn from the boot. An upper toe section is fastened to the sole which overlaps the upper heel section thereby biasing the opening of the upper heel section to a closed position.

18 Claims, 3 Drawing Sheets

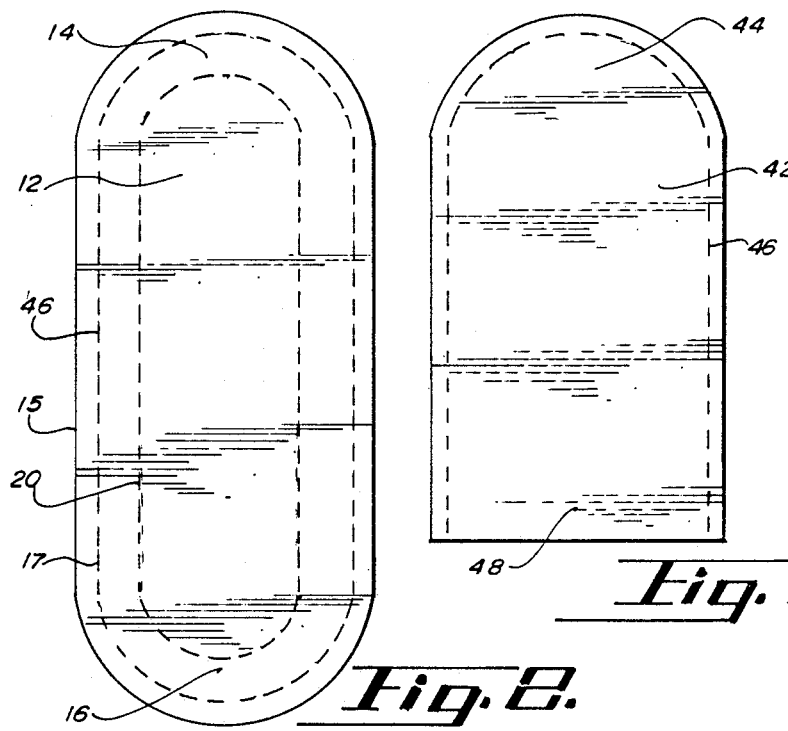
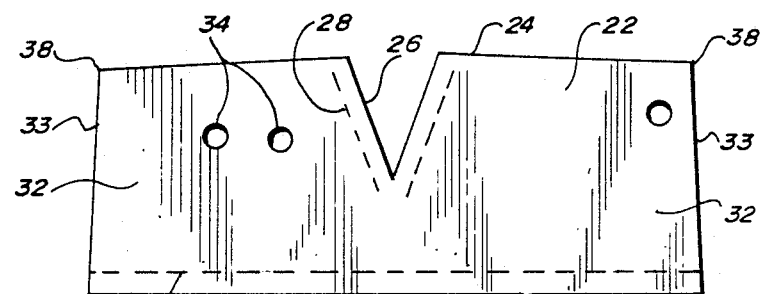
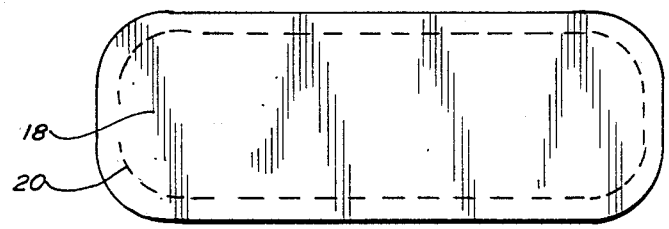

DOG BOOTS

BACKGROUND OF THE INVENTION

This invention relates to a dog boot for the rear leg of a dog.

As seen in FIG. 1, generally the anatomy of the rear leg 1 of a dog includes the thigh 2 which comprises the upper leg and the foot or paw 3 which is the portion of the leg 1 which contacts the ground. The foot 3 and thigh 2 are intermediately joined by the tarsus joint 4. The bony protuberance at the rear of the tarsus joint 4 or posteriorly located with respect to the joint is the fibular tarsal 5 which is generally equivalent to the human heel.

Attempts have been made to construct dog boots. However, such constructions often are clumsy, and difficult to put on, take off and secure. Further, prior art dog boots often interfere with the animal's gate, constrict the blood flow to the animal's foot 3, and do not permit the necessary air circulation about the covered portion of the dog's leg 1 necessary for comfortable extended wear.

SUMMARY OF THE INVENTION

A dog boot for the rear leg of a dog having a foot, a tarsus joint and a fibular tarsal. The boot is comprised of a sole extending from the foot to the tarsus joint. An upper heel section is fastened to the sole and fixed proximally the tarsus joint shaped so that the boot is anchored on the leg by the fibular tarsal. The upper heel section has an opening for permitting the foot to enter and be withdrawn from the boot. An upper toe section is fastened to the sole which overlaps the upper heel section thereby biasing the opening of the upper heel section to a closed position.

A principal advantage and objective of the present invention is that it keeps the rear foot of the dog warm during cold weather as well as clean to prevent soiling of the household and its contents.

Another advantage of the present invention is that it prevents footsore while the boot protects the foot or paw from thorns, burrs, rocks, hot tar, freezing and the affects or corrosive chemicals and salt.

Another advantage of the present invention is that the boot is comfortable for long wear as well as ideal for working dogs. The dog boot permits breathing or circulation of moisture and air therethrough. The boot is flexible in cold weather and does not interfere with the gait or normal leg movement of the dog. The boot fits on the dog's leg and stays on without the need for constricting binders or bands which may affect blood circulation of the animal.

Still another advantage of the present invention is that it provides additional traction for the dog in snow or the like in that the sole extends beyond the foot up to the tarsus joint.

BRIEF DESCRIPTION OF THE DRAWINGS

FIG. 2 is a pattern view of the sole;
FIG. 3 is a pattern view of the non-slip pad;
FIG. 4 is a pattern view of the upper heel section;
FIG. 5 is a pattern view of the upper toe section.

DESCRIPTION OF THE PREFERRED EMBODIMENT

Figure 1:
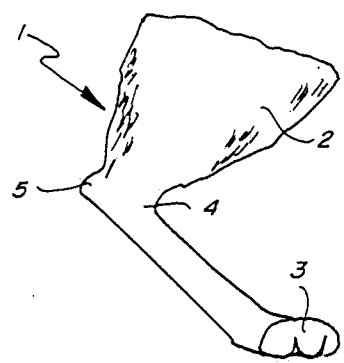
FIG. 1 is an anatomical sketch of a rear dog leg.

Referring generally to FIGS. 2-9, the dog boot 10 for the rear leg 1 of a dog generally comprises three main sections fastened together comprised of the sole 12, upper heel section 22, and upper toe section 42 which partially overlaps the upper heel section 22. The sole 12 may also have a non-slip or skid-proof pad 18 fastened thereto.

Preferably the dog boot 10 is constructed of natural leather although synthetic products or fabrics are readily usable. Leather is beneficial in that it retains its flexibility in cold weather, wears well and permits the dog boot 10 to breathe or circulate air and moisture therethrough.

More specifically, referring to FIGS. 2-5, the pertinent sections of the dog boot 10 may be seen in their pattern form prior to fastening them together described more fully below. FIG. 2 shows the elliptical shape of the sole 12 having a toe portion 14, intermediate portion 15 and heel portion 16. Fastening means, stitching or the like for the respective sections of the boot 10 are shown by upper heel section stitching 17 and upper toe section stitching 46. A non-slip pad 18 may be affixed to the bottom of sole 12 by way of stitching 20 or adhesive. Non-slip pad 18 may be made of a felt or roughened leather or other material having tread, ribs or other textured construction for traction.

The upper heel section 22 shown in FIG. 4 is substantially rectangular in its patterned design having a top edge 24 with a central V-cut 26 approximately 20° therein. The sides of a V-cut 26 are fastened together by means of stitching 28. Upper heel section 22 also has a bottom 30 where stitching 17 may be passed therealong to affix or fasten upper heel section 22 to the sole 12. Upper heel section 22 also has sides 32 each having like distal or leading edges 33 with tie string holes 34 which permit tie string 36 to be threaded therethrough for securing dog boot 10 about the dog leg 1. The sides 32 also have upper corners 38.

Figure 7:
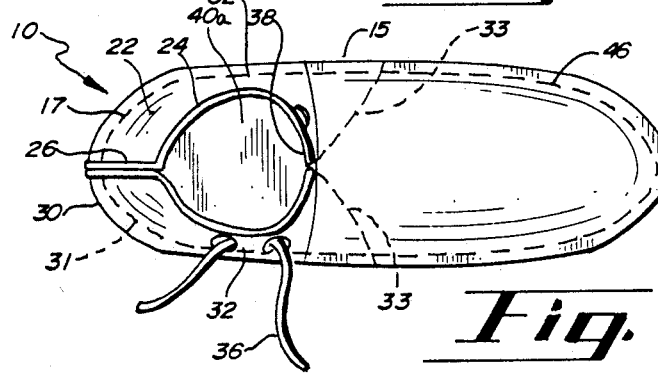
FIG. 7 is a top view of the open dog boot in the opened condition.
Figure 8:
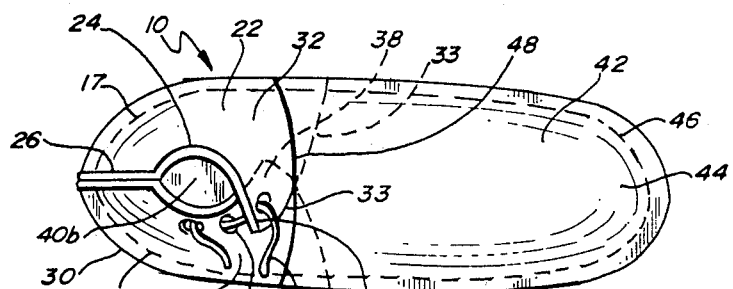
FIG. 8 is a top view of the dog boot with the opening in a closed position.

After upper heel section 22 is fastened to the sole 12 by way of stitching 17, opening 40 becomes apparent as it is formed by opposing sides 32 essentially having an open condition 40a and a closed condition 40b (see FIGS. 7 and 8).

Upper toe section 42 (FIG. 5) has a toe portion 44 with stitching 46 for fastening the toe portion 44 onto the sole 12 partially overlapping the upper heel section 22. The upper toe section 40 may be considered to be of a truncated elliptical shape in form with sole 12. Upper toe section 42 opposite the toe portion 44 has a straight edge or joint portion 48 which overlaps the sides 32 of the upper heel section 22.

Figure 9:
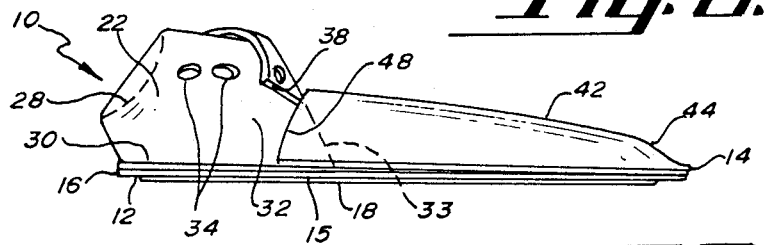
FIG. 9 is a side elevational view of the dog boot with the opening in the closed position.

Referring to FIGS. 6-9, the assembled construction of the dog boot 10 may be appreciated. It may readily be seen that the upper toe section 42, particularly the tarsus joint portion 48 overlaps the sides 32 of the upper heel section 22 in such a manner that the edges 33 of sides 32 are biased inwardly toward each other as upper toe section 42 presses the upper heel section 22 downwardly. With the edges 33 abutting each other shown in FIGS. 6 and 7, the opening 40 is in its open condition 40a ready for insertion of the dog foot 3. When the edges 33 of sides 32 are moved from an abutment condition, they tend to overlap each other and put opening 40 in its closed condition as seen in FIGS. 8 and 9. With the dog foot 3 being within the boot 10 and opening 40 in its closed condition 40b, the tie string 36 may be secure looped through tie string holes 34 and be tied together to secure the upper heel section about the tarsus joint 4 of the dog leg 1 anchoring the closed V-cut of the heel section 22 about the fibular tarsal 5 or heel of the dog leg 1. VELCRO fasteners may also work.

Figure 10:
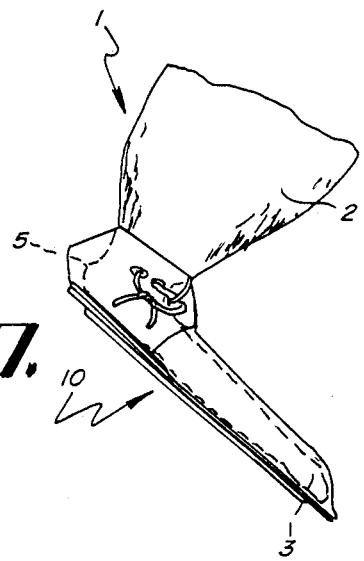
FIG. 10 is an elevational view of a dog's leg in the standing position donning a dog boot.
Figure 11:
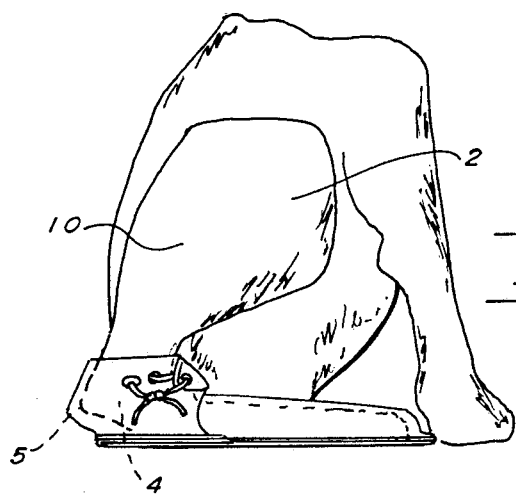
FIG. 11 is a view of a dog in the sitting position donning the dog boot.
Figure 6:
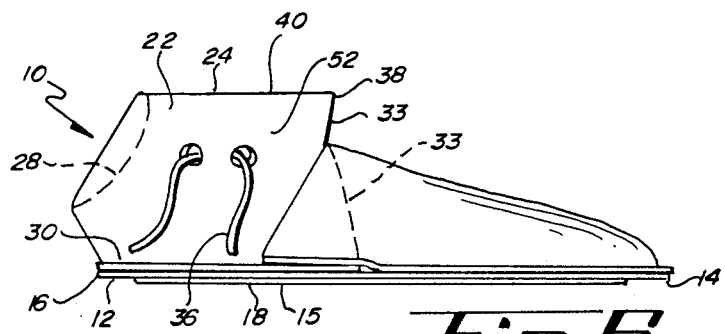
FIG. 6 is a side elevational view of the dog boot in an opened condition.

As may be appreciated by FIGS. 10 and 11, the sole 12 and non-slip pad 18 of the dog boot 10 extends from the dog's foot or paw 3 to its tarsus joint 4. By this arrangement, the sole 12 increases the working surface area of the dog's foot 3 for traction as well as pushing off snow, ice, dirt, sand and the like as the dog moves forward.

Further still, when a dog is in the sitting position shown in FIG. 11, the dog leg from the paw 3 to the tarsus joint 4 is protected from the ground environment both from a freezing standpoint as well as a cleanliness standpoint for the benefit of the animal.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed:

1. A dog boot for the rear leg of a dog having a foot, a tarsus joint and a fibular tarsal, wherein the dog boot comprises
    (a) a sole having a toe portion extending from the foot beyond an intermediate portion to a heel portion adjacent the tarsus joint;
    (b) an upper heel section fastened to the sole from the heel portion to the intermediate portion fitting proximally about the tarsus joint and shaped so that the boot is anchored on the leg by the fibular tarsal with an opening for permitting the foot to enter and be withdrawn from the boot;
    (c) an upper toe section for receiving the foot thereunder fastened to the sole from the toe portion to the intermediate portion overlapping the upper heel section fastened thereat to bias the opening in the upper heel section to a closed position.

2. The dog boot of claim 1, wherein the upper heel section has therein a V-cut located rearwardly of the opening which is closed by fastening means to shape the upper heel section about the fibular tarsal.

3. The dog boot of claim 2, wherein the fastening means comprises stitching.

4. The dog boot of claim 1, wherein the upper heel section has opposing sides located forward and below the opening and extending under the upper toe section.

5. The dog boot of claim 4, wherein the sides are biased to overlap one another by the overlapping intermediate upper toe section to close the opening.

6. The dog boot of claim 4, further comprising tying means on the sides to hold the opening closed.

7. The dog boot of claim 6, wherein the tying means comprises at least one hole in each side and a string for passing through the holes.

8. The dog boot of claim 1, wherein the underside of the sole may have a skid proof pad fastened thereto for traction.

9. The dog boot of claim 1, wherein the sole, heel section and toe section are fastened together by stitching.

10. The dog boot of claim 1, wherein the dog boot is made of natural leather.

11. A dog boot for the rear leg of a dog having a foot, a tarsus joint and a fibular tarsal, wherein the dog boot comprises
    (a) a sole having a toe portion extending from the foot beyond an intermediate portion to a heel portion adjacent the tarsus joint;
    (b) an upper heel section fastened to the sole from the heel portion to the intermediate portion fitting proximally about the tarsus joint and shaped so that the boot is anchored on the leg by the fibular tarsal with a top opening for permitting the foot to enter and be withdrawn from the boot and opposing sides located forward and below the opening, the sides having leading edges; and
    (c) an upper toe section for receiving the foot thereunder fastened to the sole from the toe portion to the intermediate portion overlapping the upper heel section thereat including forward edges of the sides thereby biasing the sides and leading edges to overlap each other while biasing the opening to a closed position.

12. The dog boot of claim 11, wherein the upper heel section therein has a V-cut located rearwardly of the opening which is closed by fastening means to shape the upper heel section about the fibular tarsal.

13. The dog boot of claim 12, wherein the fastening means comprises stitching.

14. The dog boot of claim 11, further comprising tying means the sides to hold the opening in the closed position.

15. The dog boot of claim 14, wherein the tying means comprises at least one hole in each side and a string for passing through the holes.

16. The dog boot of claim 11, wherein the underside of the sole may have a skid-proof pad fastened thereto for traction.

17. The dog boot of claim 11, wherein the sole, heel section and toe section are fastened together by stitching.

18. The dog boot of claim 11, wherein the dog boot is made of natural leather.

* * * * *